United States Patent
Elbkaily et al.

(10) Patent No.: US 11,524,721 B2
(45) Date of Patent: Dec. 13, 2022

(54) VEHICLE FRAME ASSEMBLY

(71) Applicant: Ford Global Technologies, LLC, Dearborn, MI (US)

(72) Inventors: Marwan Ahmad Elbkaily, Canton, MI (US); Tushar B. Kamble, Farmington, MI (US); Juyoung Lee, West Bloomfield, MI (US); Gargi Tandra, Canton, MI (US); Daniel Joseph McCarthy, Northville, MI (US); Jeremiah James Smith, Tupperville (CA)

(73) Assignee: Ford Global Technologies, LLC, Dearborn, MI (US)

( * ) Notice: Subject to any disclaimer, the term of this patent is extended or adjusted under 35 U.S.C. 154(b) by 550 days.

(21) Appl. No.: 16/563,177

(22) Filed: Sep. 6, 2019

(65) Prior Publication Data

US 2021/0070364 A1    Mar. 11, 2021

(51) Int. Cl.
  *B62D 21/03*    (2006.01)
  *B62D 24/00*    (2006.01)
  *B60R 19/24*    (2006.01)
  *B62D 25/08*    (2006.01)

(52) U.S. Cl.
  CPC .............. *B62D 21/03* (2013.01); *B60R 19/24* (2013.01); *B62D 24/00* (2013.01); *B62D 25/082* (2013.01)

(58) Field of Classification Search
  CPC ...... B62D 21/03; B62D 25/082; B62D 21/02; B62D 21/152; B60R 19/24; B60K 5/12
  See application file for complete search history.

(56) References Cited

U.S. PATENT DOCUMENTS

| | | | | |
|---|---|---|---|---|
| 1,547,263 A | * | 7/1925 | Pomeroy | B62D 21/02 180/312 |
| 2,954,998 A | * | 10/1960 | Kushler | B62D 25/082 180/312 |
| 4,392,545 A | * | 7/1983 | Harasaki | B62D 21/11 180/297 |
| 4,729,156 A | | 3/1988 | Norris, Jr. et al. | |
| 5,094,425 A | | 3/1992 | Stephens | |
| 5,915,727 A | | 6/1999 | Bonnville | |
| 6,460,889 B2 | | 10/2002 | Iyanagi et al. | |
| 8,141,904 B2 | * | 3/2012 | Akaki | B62D 21/02 180/312 |
| 9,956,991 B1 | | 5/2018 | Nishikawa et al. | |

(Continued)

FOREIGN PATENT DOCUMENTS

| | | | | |
|---|---|---|---|---|
| CN | 109050668 A | * | 12/2018 | ............. B62D 21/02 |
| CN | 109987140 A | * | 7/2019 | ............... B60K 5/12 |

(Continued)

*Primary Examiner* — Karen Beck
(74) *Attorney, Agent, or Firm* — Frank A. MacKenzie; Bejin Bieneman PLC (57) ABSTRACT

An assembly includes a pair of frame rails, each of the frame rails elongated along a vehicle-longitudinal axis and having a front portion, a rear portion, and an elevated portion above and between the front portion and the rear portion. The assembly includes a cross-support fixed to at least one of the frame rails at the elevated portion and extending along a cross-vehicle axis from one of the frame rails toward the other of the frame rails. The assembly includes a bracket fixed to the frame rail at the elevated portion and fixed to the cross-support.

20 Claims, 7 Drawing Sheets

(56) References Cited

U.S. PATENT DOCUMENTS

| | | | |
|---|---|---|---|
| 2008/0238146 A1* | 10/2008 | Nusier | B62D 21/152 |
| | | | 296/193.09 |
| 2015/0130217 A1* | 5/2015 | Shaner | B62D 21/152 |
| | | | 296/187.1 |
| 2018/0141511 A1* | 5/2018 | Barbat | B62D 21/152 |
| 2018/0201320 A1* | 7/2018 | Knittel | B62D 21/02 |
| 2019/0016387 A1* | 1/2019 | Elbkaily | B62D 21/02 |
| 2019/0054875 A1* | 2/2019 | Ehn | B62D 21/11 |
| 2019/0077468 A1* | 3/2019 | Hulstein | B62D 21/20 |
| 2019/0210651 A1* | 7/2019 | Svacha | B62D 33/077 |
| 2020/0079438 A1* | 3/2020 | Keen | B62D 24/00 |
| 2021/0024131 A1* | 1/2021 | Baccouche | B60K 1/04 |

FOREIGN PATENT DOCUMENTS

| | | | | |
|---|---|---|---|---|
| CN | 111661153 A | * | 9/2020 | B60R 19/00 |
| CN | 112659877 A | * | 4/2021 | B60K 1/00 |
| CN | 112677914 A | * | 4/2021 | B62D 21/02 |
| DE | 102004010699 A1 | * | 9/2004 | B60G 7/02 |
| DE | 202015102733 U1 | * | 10/2015 | B62D 21/152 |
| DE | 202018100260 U1 | * | 3/2018 | B62D 21/02 |
| EP | 2314500 A2 | * | 4/2011 | B62D 21/11 |
| JP | 2002356175 A | | 12/2002 | |
| JP | 3632666 B2 | * | 3/2005 | B62D 21/152 |
| KR | 19980085537 A | * | 12/1998 | |
| WO | WO-2017040381 A | * | 3/2017 | B62D 21/03 |

* cited by examiner

VEHICLE FRAME ASSEMBLY

BACKGROUND

A vehicle may have a body-on-frame construction (also referred to as a cab-on-frame construction). In other words, the body and frame rails are separate components, i.e., are modular, and the body is supported on and affixed to the frame rails. The vehicle may be of a unibody construction. In the unibody construction, a body, e.g., rockers, pillars, roof rails, etc., serves as the vehicle frame (including frame rails, etc.), and the body (including the rockers, pillars, roof rails, etc.) may be unitary, i.e., a continuous one-piece unit.

During a vehicle front impact, the frame and/or body may deform. The deformation may absorb energy, while redirecting and transferring force and momentum. Forward movement of the vehicle may be redirected vertically and may cause the vehicle to rise relative to ground supporting the vehicle. This rise moves a passenger cabin of the vehicle upward and affects kinematics of objects in the passenger cabin.

DETAILED DESCRIPTION

An assembly includes a pair of frame rails, each of the frame rails elongated along a vehicle-longitudinal axis and having a front portion, a rear portion, and an elevated portion above and between the front portion and the rear portion. The assembly includes a cross-support fixed to at least one of the frame rails at the elevated portion and extending along a cross-vehicle axis from one of the frame rails toward the other of the frame rails. The assembly includes a bracket fixed to the frame rail at the elevated portion and fixed to the cross-support.

The elevated portion may include a front inclined portion extending upward from the front portion of the frame rail, a rear inclined portion extending upward from the rear portion of the frame rail, and a middle portion extending from the front inclined portion to the rear inclined portion.

The bracket may be fixed to the middle portion of the elevated portion.

The middle portion and the bracket may be stiffer than the elevated portion where the middle portion connects to the rear inclined portion.

Each of the frame rails may have a bottom surface and the cross-support has a bottom surface, the bracket fixed to the bottom surface of one of the frame rails and the bottom surface of the cross-support.

Each of the frame rails may have a bottom surface and the cross-support has a bottom surface, the bracket fixed to the bottom surface of one of the frame rails and the bottom surface of the cross-support.

Each of the frame rails may have a bottom surface that includes an inclined portion.

The bracket may be fixed to the bottom surface of the frame rail at the inclined portion.

Each of the frame rails may be thicker forward of the inclined portion than rearward of the inclined portion.

The bracket may extend along the frame rail forward of the cross-support.

The bracket may include a front edge, the front edge arcuately extending along the frame rail and the cross-support.

The cross-support may be an engine cradle.

The bracket may be L-shaped.

A first portion of the bracket may extend forward along the frame rail from the cross-support, and a second portion of the bracket may extend inward from the frame rail along the cross-support.

The elevated portion and the bracket may be stiffer than the frame rail forward of the bracket.

The elevated portion and the bracket may be stiffer than the frame rail where the rear portion connects to the elevated portion.

The bracket may include a rear edge, the rear edge at the frame rail forward of the rear edge at the cross-support.

The assembly may include a body defining a passenger cabin, the bracket forward of the passenger cabin.

The body may be supported on the frame rails.

Each of the frame rails may include a front distal end, and the assembly may include a bumper fixed to the front distal ends of the frame rails.

With reference to the Figures, wherein like numerals indicate like parts throughout the several views, an assembly 20 for controlling upward movement, i.e., rise, of a vehicle 24 is shown. The assembly 20 includes a pair of frame rails 26. Each of the frame rails 26 are elongated along a vehicle-longitudinal axis A1 and have a front portion 28, a rear portion 30, and an elevated portion 32 above and between the front portion 28 and the rear portion 30. The assembly 20 includes a cross-support 34 fixed to at least one of the frame rails 26 at the elevated portion 32 and extending along a cross-vehicle axis A2 from one of the frame rails 26 toward the other of the frame rails 26. The assembly 20 includes a bracket 36 fixed to the frame rail 26 at the elevated portion 32 and fixed to the cross-support 34.

The assembly 20 controls deformation of the frame rails 26 to reduce downward displacement of a front 38 of the vehicle 24 relative to a center of mass CM of the vehicle 24, and thereby reduces upward movement, or rise, of a passenger cabin 40 of the vehicle 24 relative to a ground supporting the vehicle 24 during a front impact to the vehicle 24.

The adjectives "first" and "second" are used throughout this document as identifiers and are not intended to signify importance or order.

The vehicle 24 may be any type of passenger or commercial automobile such as a car, a truck, a sport utility vehicle, a crossover vehicle, a van, a minivan, a taxi, a bus, etc.

The vehicle 24 defines the vehicle-longitudinal axis A1, i.e., extending between the front 38 and the rear 22 of the vehicle 24. The vehicle 24 defines the cross-vehicle axis A2, i.e., extending between a right side 42 and a left side 44 of the vehicle 24. The vehicle 24 defines a vehicle-vertical axis A3, i.e., extending between a top 46 and a bottom 48 of the vehicle 24. The vehicle-longitudinal axis A1, the cross-vehicle axis A2, and the vehicle-vertical axis A3 are perpendicular to each other.

The vehicle 24 may include a frame 49. The frame 49 supports and connects components and systems of the vehicle 24 into a single assembly. For example, the frame 49 may support a brake system, a steering system, a suspension system, a propulsion system, etc. The frame 49 includes the frame rails 26, the cross support 34, and/or any other suitable structure for supporting and connecting components and systems of the vehicle 24. The frame 49 may be metal, carbon fiber, etc.

The vehicle 24 may include a body 50. The body 50 provides an aesthetic look to the vehicle 24 and partially or fully defines volumes of the vehicle 24, e.g., the passenger cabin 40, a bed, a trunk, and/or an engine compartment. The body 50 may include panels of material such as aluminum, steel, plastic, carbon fiber, or any suitable material. The body 50 can be supported on the frame rails 26, e.g., by body mounts. The body 50 may be fixed relative to the body mounts, e.g., via fasteners, dampeners, welds, etc.

The passenger cabin 40 is designed to house occupants, if any, of the vehicle 24. The passenger cabin 40 includes one or more seats. The passenger cabin 40 may include controls for operating the vehicle 24, an infotainment system, etc. The passenger cabin 40 is above the frame rails 26, i.e., relative to the vehicle-vertical axis A3. In other words, the frame rails 26, may be between the passenger cabin 40 and ground supporting the vehicle 24 when the vehicle 24 is right-side-up, i.e., supported by tires of the vehicle 24.

Figure 1:
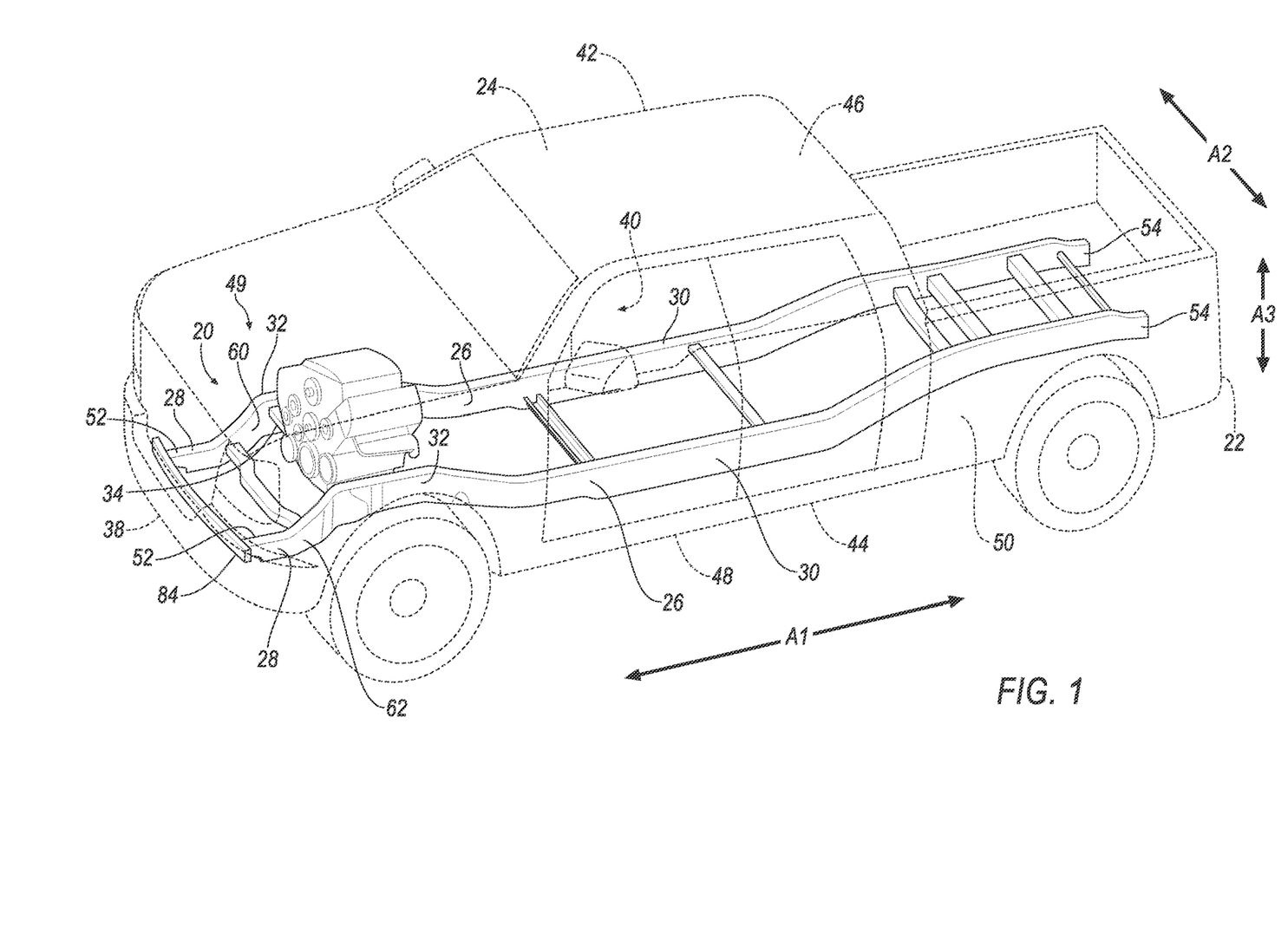
FIG. 1 is a perspective view of a vehicle having a frame assembly.
Figure 2:
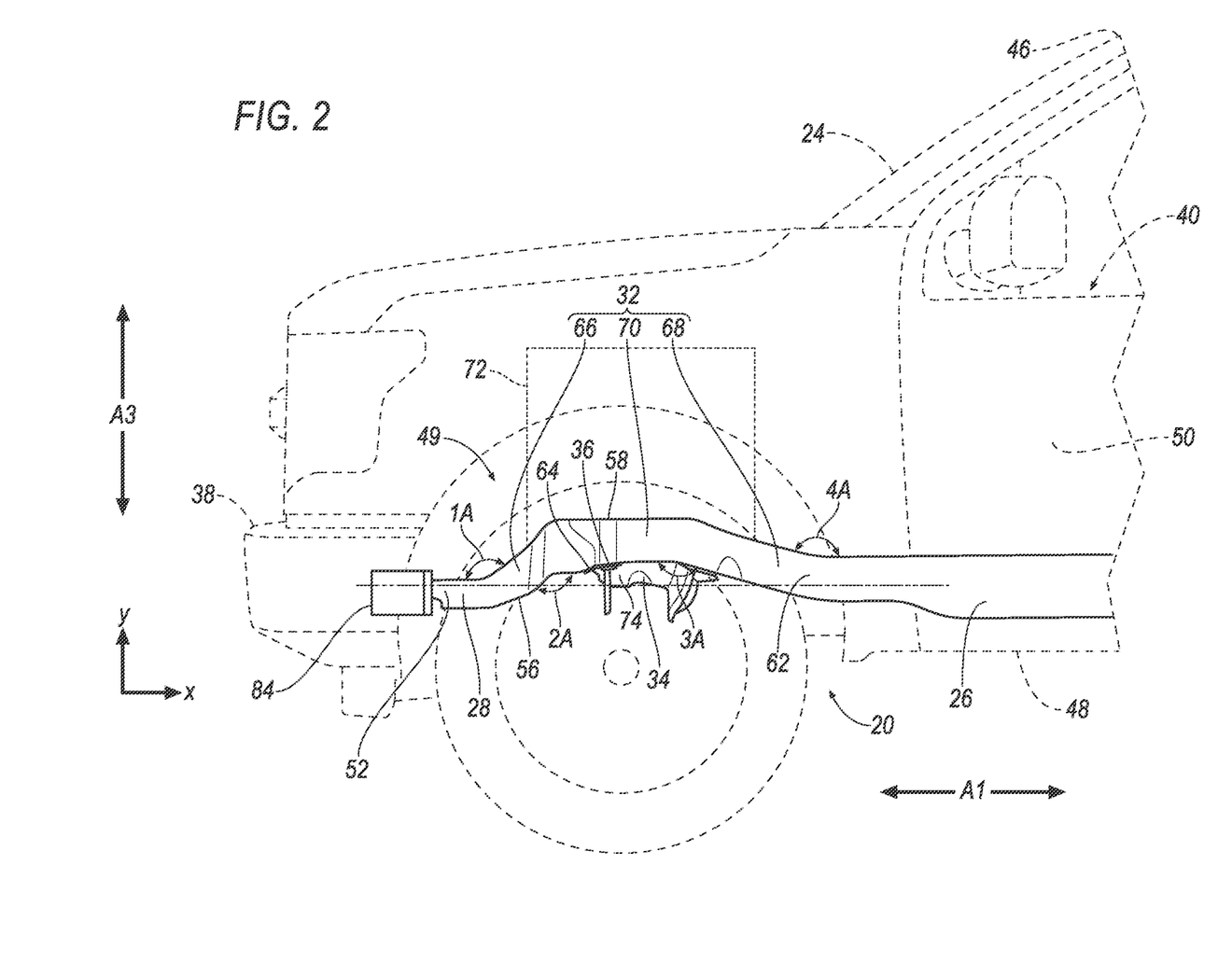
FIG. 2 is a side view of the vehicle having the frame assembly.
Figure 4:
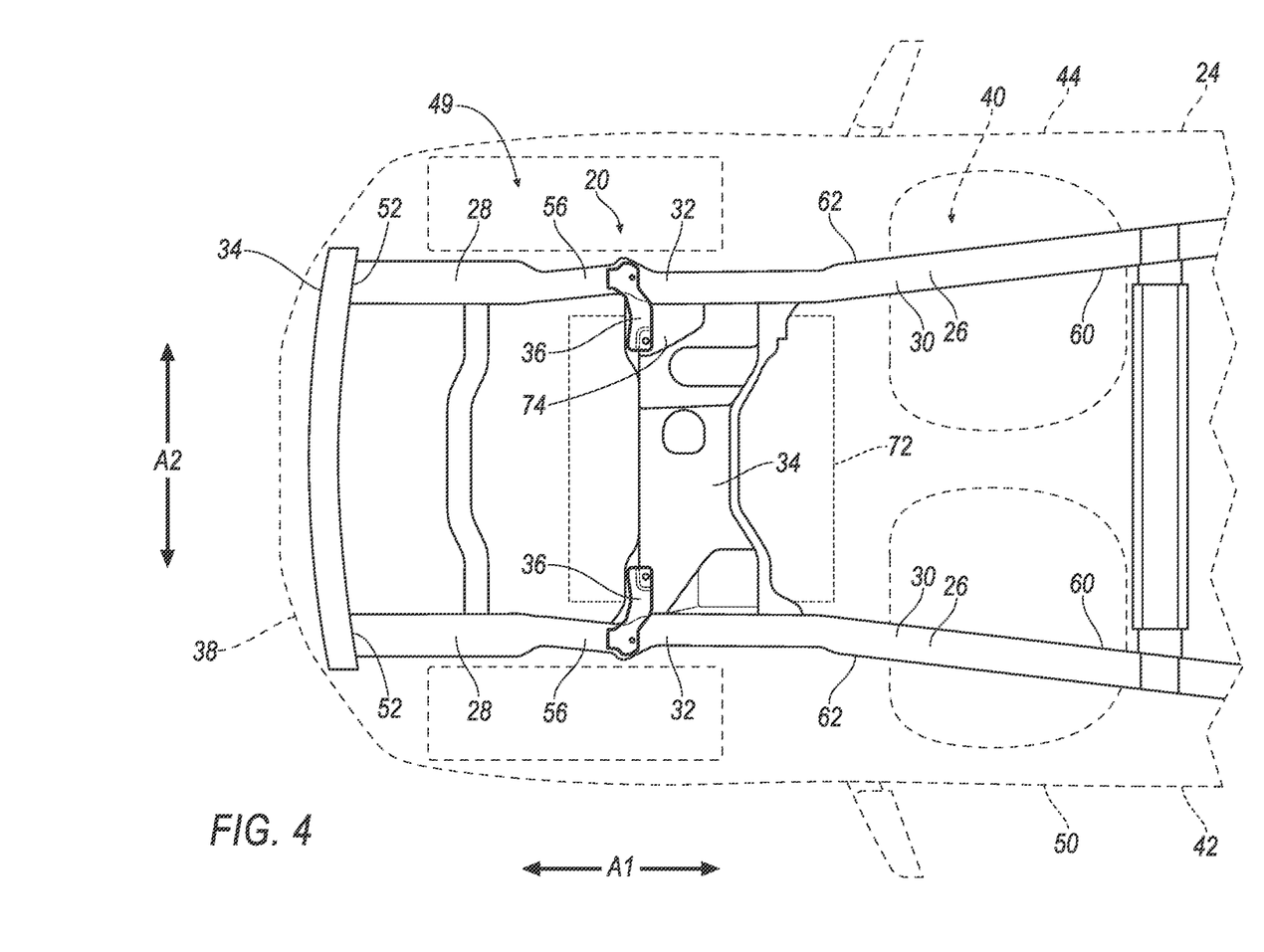
FIG. 4 is a bottom view of the frame assembly.

The vehicle 24 illustrated in FIGS. 1, 2 and 4 has a body-on-frame construction (also referred to as a cab-on-frame construction). In other words, the body 50 and frame 49 are separate components, i.e., are modular, and the body 50 is supported on and affixed to the frame 49, e.g., the frame rails 26. The vehicle 24 may be of a unibody construction. In the unibody construction, a body, e.g., rockers, pillars, roof rails, etc., serves as the vehicle frame (including frame rails 26, the cross support 34, etc.), and the body (including the rockers, pillars, roof rails, etc.) may be unitary, i.e., a continuous one-piece unit.

The frame rails 26 are elongated along the vehicle-longitudinal axis A1. For example, the frame rails 26 may be elongated between the front 38 and the rear 22 of the vehicle 24. Each of the frame rails 26 may extend from a front distal end 52 at the front 38 to a rear distal end 54 at the rear 22 of the vehicle 24. The frame rails 26 are spaced from each other along the cross-vehicle axis A2. For example, the one of the frame rails 26 may be proximate the right side 42 of the vehicle 24, i.e., closer to the right side 42 than the left side 44, and the other frame rail 26 may be proximate the left side 44 of the vehicle 24.

Each of the frame rails 26 has a bottom surface 56 that faces downward relative to the vehicle-vertical axis A3. The bottom surface 56 may be opposite a top surface 58 that faces upward relative to the vehicle-vertical axis A3. Each of the frame includes an inboard surface 60 that faces a center of the vehicle 24 relative to the cross-vehicle axis A2. The inboard surface 60 may be opposite an outboard surface 62 of the frame rail 26 that faces away from the center of the vehicle 24 relative to the cross-vehicle axis A2. The inboard surface 60 and outboard surface 62 may extend downward from the top surface 58 of the frame rail 26 to the bottom surface 56.

The bottom surface 56 of each of the frame rails 26 may include an inclined portion 64. The inclined portion 64 may extend along the vehicle-vertical axis A3 and the vehicle-longitudinal axis A1, e.g., when viewed from the right side 42 or the left side 44 of the vehicle 24. The frame rail 26 is thicker forward of the inclined portion 64 than rearward of the inclined portion 64 relative to the vehicle-vertical axis A3. In other words, a distance between the top surface 58 and the bottom surface 56 of the frame rail 26 is greater forward of the inclined portion 64 than rearward of the inclined portion 64.

Each frame rail 26 includes the front portion 28, the rear portion 30, and the elevated portion 32. The elevated portion 32 is above the front portion 28 and the rear portion 30 relative to the vehicle-vertical axis A3. For example, the elevated portion 32 is closer to the top 46 of the vehicle 24 than the front portion 28 and the rear portion 30. The elevated portion 32 is between the front portion 28 and the rear portion 30 relative to the vehicle-longitudinal axis A1. For example, the front portion 28 is closer to the front 38 of the vehicle 24 than the elevated portion 32 and the rear portion 30 is closer to the rear 22 of the vehicle 24 than the elevated portion 32.

The elevated portion 32 of each frame rail 26 may include a front inclined portion 66, a rear inclined portion 68, and a middle portion 70. The front inclined portion 66 may extend upward and rearward relative to the vehicle-vertical axis A3 and the vehicle-longitudinal axis A1 and from the front portion 28 of the frame rail 26 to the middle portion 70 of the elevated portion 32. The rear inclined portion 68 may extend upward and forward relative to the vehicle-vertical axis A3 and the vehicle-longitudinal axis A1 from the rear portion 30 of the frame rail 26 to the middle portion 70. The middle portion 70 extends from the front inclined portion 66 to the rear inclined portion 68 along the vehicle-longitudinal axis A1. The inclined portion 64 of the bottom surface 56 may be at the middle portion 70 of the elevated portion 32, e.g., proximate the front inclined portion 66. In other words, the inclined portion 64 of the bottom surface 56 may be between the front inclined portion 66 and the rear inclined portion 68, and closer to the front inclined portion 66 than the rear inclined portion 68.

Figure 3:
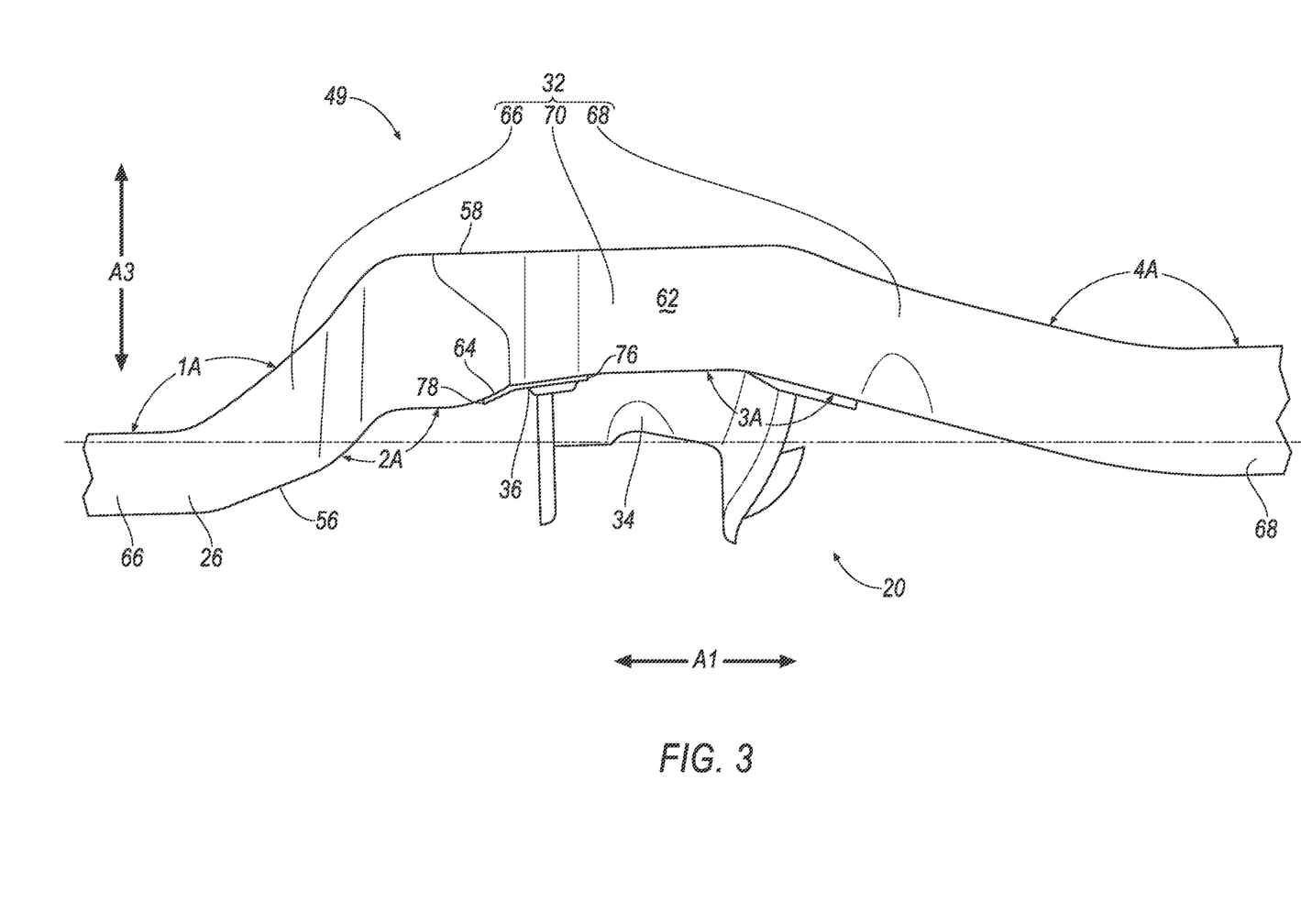
FIG. 3 is a side view of the frame assembly.

With reference to FIG. 3, pairs of the portions 28, 30, 66, 68, 70 define angles 1A, 2A, 3A, 4A. The angles 1A, 2A, 3A, 4A may be defined by the bottom surface 56 or top surface 58 of the frame rail 25 at the respective portions 28, 30, 66, 68, 70. For example, the top surface 58 at the front portion 28 and the front inclined portion 66 define a first angle 1A. As another example, the bottom surface 56 at the front inclined portion 66 and the middle portion 70 define a second angle 2A. As yet another example, the bottom surface 56 at the middle portion 70 and the rear inclined portion 68 define a third angle 3A. As one more example, the top surface 58 at the rear inclined portion 68 and the rear portion 30 define a fourth angle 4A.

Application of compressive force on the frame rails 26 may cause deformation of the frame rails 26 such that a magnitude of the angles is decreased. Decreasing the first angle 1A and/or the fourth angle 4A may move the front 38 of the vehicle 24 upward relative to the vehicle-vertical axis A3 and a portion of the vehicle 24 rearward of the elevated portion 32. Decreasing the second angle 2A and/or the third angle 3A may move the front 38 of the vehicle 24 downward relative to the vehicle-vertical axis A3 and relative to the portion of the vehicle 24 rearward of the elevated portion 32.

The cross-support 34 supports one or more components of the vehicle 24, e.g., relative to and between the frame rails 26. For example, the cross-support 34 may be an engine cradle supporting an internal combustion engine 72 of the vehicle 24. The cross-support 34 is fixed to at least one of the frame rails 26 and may be fixed to both of the frame rails 26, e.g., via weld, fastener, etc. The cross-support 34 may be fixed to the inboard surfaces 60 of the frame rails 26. The cross-support 34 may be fixed to the frame rails 26 at the elevated portions 32, e.g., the middle portion 70 of the elevated portion 32.

The cross-support 34 extends along the cross-vehicle axis A2 from one of the frame rails 26 toward the other of the frame rails 26. For example, the cross-support 34 may extend from the inboard surface 60 of one of the frame rails 26 to the inboard surface 60 of the other frame rail 26. The cross-support 34 has a bottom surface 74 that faces downward relative to the vehicle-vertical axis A3.

The bracket 36 increases strength, e.g., resistance to deformation, of the frame rail 26 and transfers force from the frame rail 26 to the cross-support 34, e.g., to control deformation of the frame rail 26 and upward movement of the vehicle 24, e.g., as described herein. For example, the bracket 36 may increase rigidity of the frame rail 26 at the inclined portion 64 and may transfer longitudinal force from the frame rail 26 from forward of the inclined portion 64 to lateral force applied to the cross support 34. The increased rigidity and force transfer via the bracket 36 may decrease deformation of the frame rail 26 such that the second angle 2A is larger/not as deformed (e.g., as compared to sans the bracket 36). Decreasing deformation of the frame rail 24 to maintain a larger second angle 2A reduces rise of the vehicle 24 during a front impact. Controlling the amount of rise controls kinematics of objects in the passenger cabin 40, e.g., such that relative movement of the object toward a windshield or roof of the passenger cabin 40 is reduced. For example, the bracket 36 may reduce a likelihood of contact during a front impact to the vehicle 24 between a crash test dummy supported on one of the seats in the passenger cabin 40 and the windshield or roof.

The bracket 36 may be metal or any suitable material. The bracket 36 may be a plate, i.e., thin and generally planar. The bracket 36 may have a surface profile that conforms to the bottom surface 56 of the frame rail 26 and the bottom surface 74 of the cross-support 34.

Figure 5:
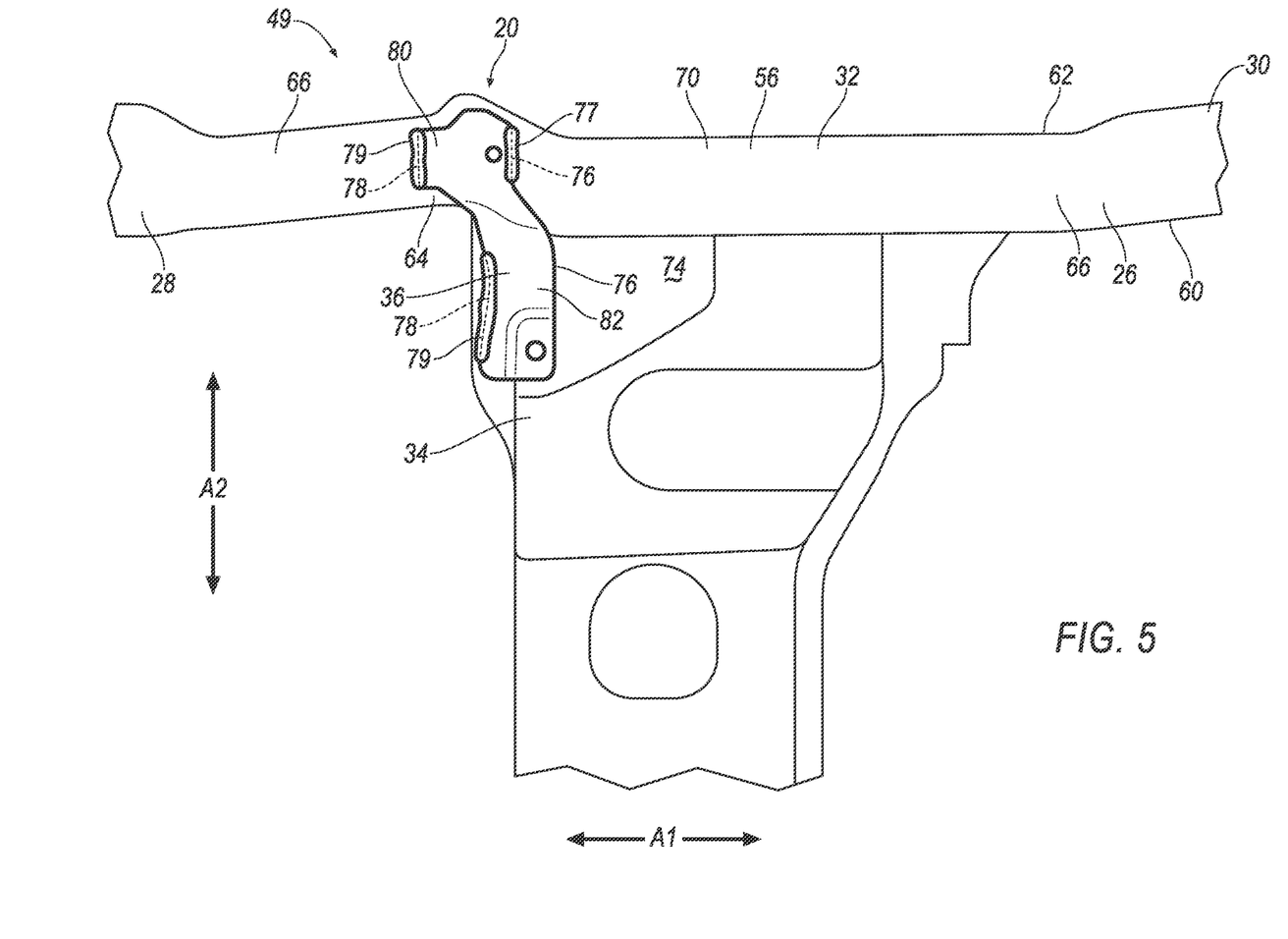
FIG. 5 is a bottom view of the frame assembly.

The bracket 36 includes a rear edge 76 and a front edge 78 opposite the rear edge 76 relative to the vehicle-longitudinal axis A1, illustrated in FIG. 5. The bracket 36 may be L-shaped. For example, the bracket 36 may include a first portion 80 that is elongated along the vehicle-longitudinal axis A1 and a second portion 82 that extends generally perpendicularly from the first portion 80, e.g., along the cross-vehicle axis A2. The bracket 36 may be forward of the passenger cabin 40 relative to the vehicle-longitudinal axis A1. In other words, the bracket 36 may be between the passenger cabin 40 and the front 38 of the vehicle 24.

Figure 6:
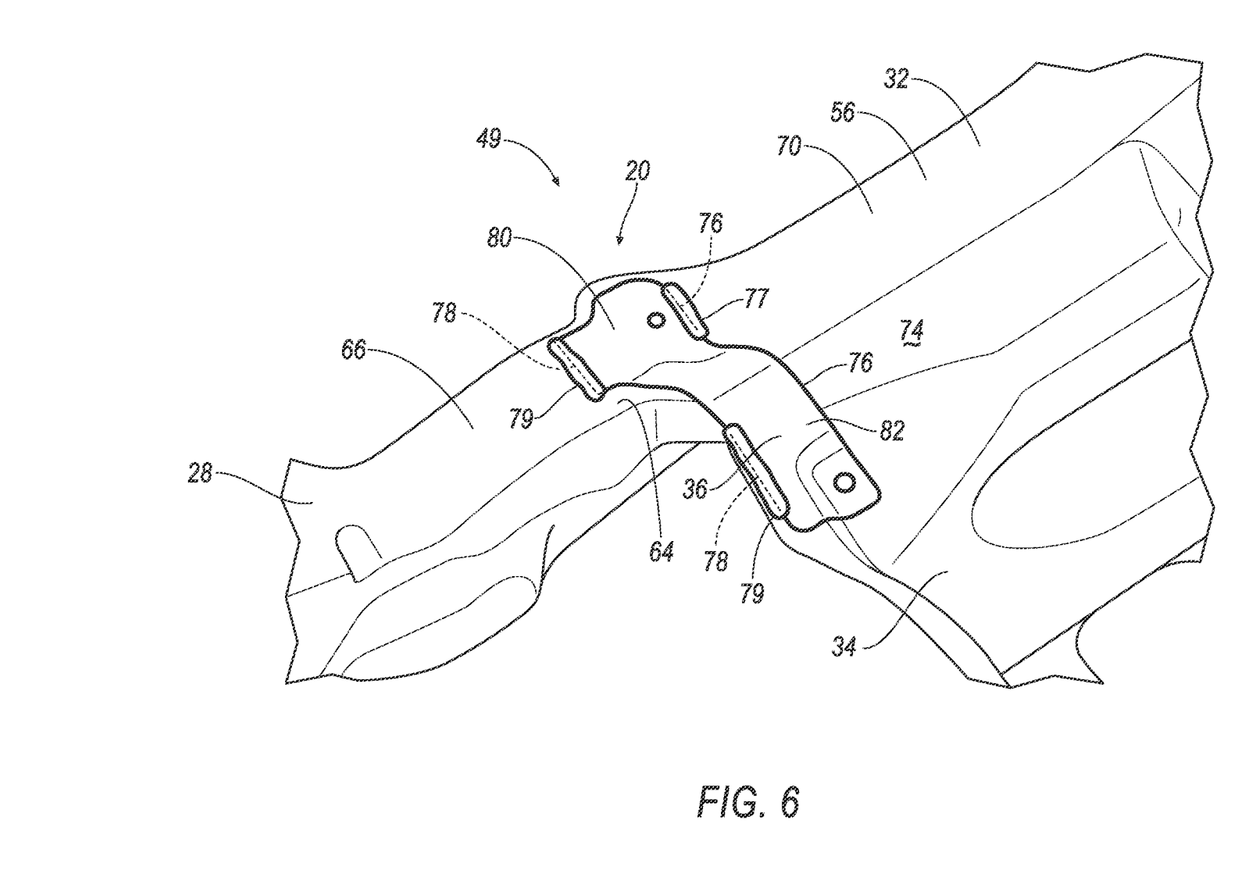
FIG. 6 is a bottom perspective view of the frame assembly
Figure 7:
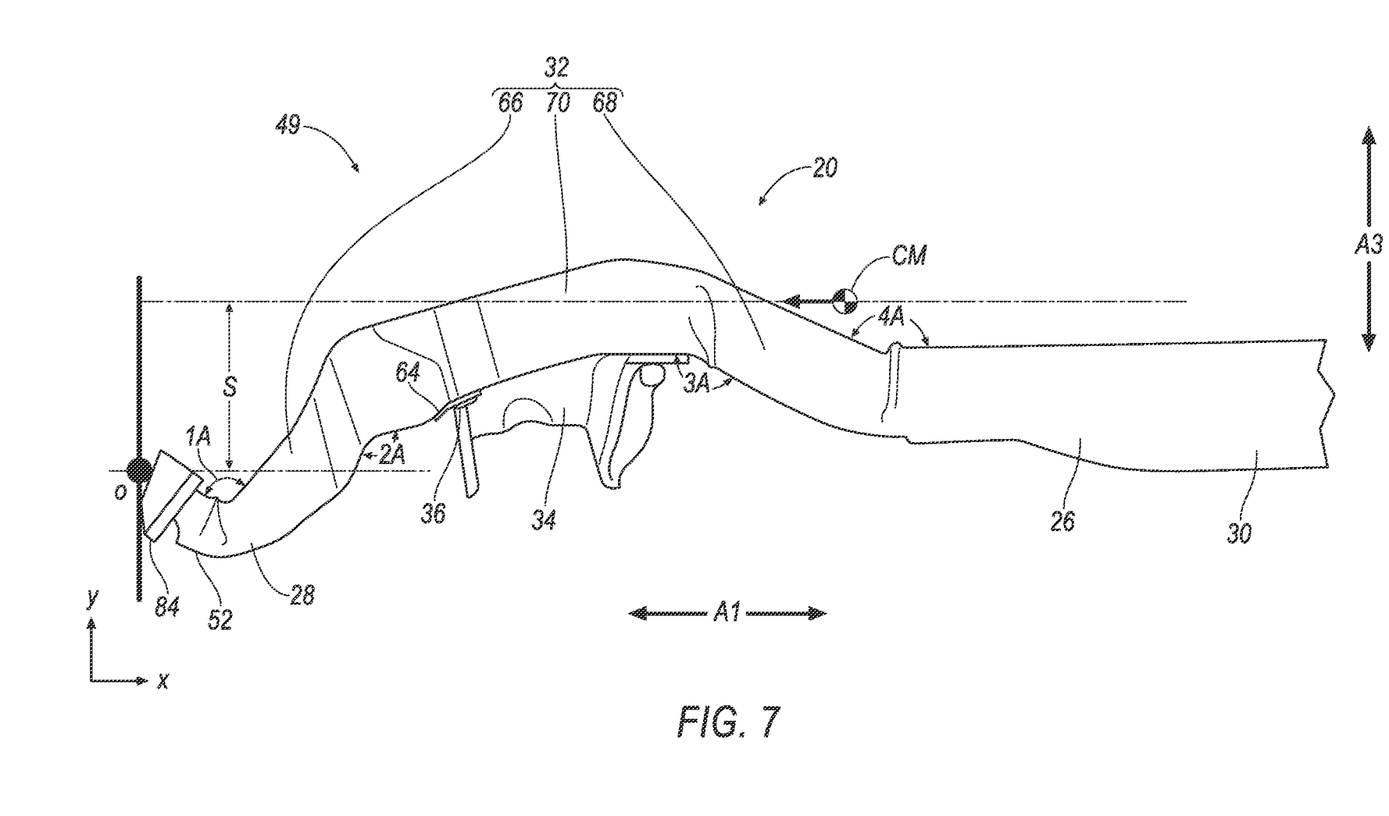
FIG. 7 is a side view of the frame assembly during a front impact.

The bracket 36 is fixed to the frame rail 26 and fixed to the cross-support 34, e.g., via fastener, weld, etc. The bracket 36 is fixed to the frame rail 26 at the elevated portion 32. For example, the bracket 36 may be fixed to the middle portion 70 of the elevated portion 32. The bracket 36 may be fixed to the bottom surface 56 of one of the frame rails 26 and the bottom surface 74 of the cross-support 34. For example, the bracket 36 may be fixed to the bottom surface 56 of the frame rail 26 at the inclined portion 64. With reference to FIGS. 5 and 6, a weld 77 may fix the rear edge 76 to the bottom surface 56 of one of the frame rails 26. A weld 79 may fix the front edge 78 to the bottom surface 56 of one of the frame rails 26 and to the bottom surface 74 of the cross-support 34.

The bracket 36 may extend along the frame rail 26 forward of the cross-support 34. For example, the first portion 80 of the bracket 36 may extend from the rear edge 76 at the cross-support 34, e.g., forward along the frame rail 26 to the front edge 78. The front edge 78 of the first portion 80 may be forward of and spaced from the cross-support 34 relative to the vehicle-longitudinal axis A1. The bracket 36 may extend inward along the cross-support 34. For example, the second portion 82 of the bracket 36 may extend inward from the frame rail 26 along the cross-support 34. In other words, the second portion 82 may extend from the frame rail 26 along the cross-support 34 toward a center of the vehicle 24 relative to the cross-vehicle axis A2. The rear edge 76 of the bracket 36 at the frame rail 26 may be forward of the rear edge 76 of the bracket 36 at the cross-support 34 relative the vehicle-longitudinal axis A1. The front edge 78 of the bracket 36 may arcuately extend along the frame rail 26 and the cross-support 34, e.g., front edge 78 of the bracket 36 may curve along an inside bend of the L-shape.

The vehicle 24 may include a bumper 84. The bumper 84 may provide a structural point of impact to the front 38 of the vehicle 24. In other words, the bumper 84 may be the forward most component of the vehicle 24 designed to provide a rigid structure and transfer force, e.g., as opposed to a cosmetic panel, a crushable energy absorbing structure, etc. The bumper 84 is elongated along the cross-vehicle axis A2. The bumper 84 is fixed to the front distal ends 52 of the frame rails 26, e.g., via fastener, weld, etc. The bumper 84 may be metal or any suitable material.

The bracket 36 and the portions 28, 30, 32, 66, 68, 70 provide variable relative stiffness to the assembly 20 and control deformation of the frame rails 26. For example, the middle portion 70 and the bracket 36 may be stiffer than the elevated portion 32 where the middle portion 70 connects to the rear inclined portion 68. In other words, application of compressive force to the frame rails 26, e.g., during a front impact to the vehicle 24, may cause less deformation of the frame rail 26 at the middle portion 70 and the bracket 36 than the elevated portion 32 where the middle portion 70 connects to the rear inclined portion 68. As another example, the elevated portion 32 and the bracket 36 are stiffer than the frame rail 26 forward of the bracket 36. In other words, application of compressive force to the frame rails 26 may cause less deformation of the frame rail 26 at the elevated portion 32 and the bracket 36 than the frame rail 26 forward of the bracket 36. As yet another example, the elevated portion 32 and the bracket 36 may be stiffer than the frame rail 26 where the rear portion 30 connects to the elevated portion 32. In other words, application of compressive force to the frame rails 26 may cause less deformation of the frame rail 26 at the elevated portion 32 and the bracket 36 than the frame rail 26 where the rear portion 30 connects to the elevated portion 32.

With reference to FIG. 6, in the event of a front impact to the vehicle 24, force from such impact may be transferred from the bumper 84 to the frame rails 26. A portion of such force may be transferred to the cross-support 34. The force may generate stress and deform the frame rails 26. A change in the second angle 2A as the frame rail 26 deforms may be less than without the bracket 36. The reduced angle change reduces downward movement of the bumper 84 relative to a remainder of the vehicle 24 and relative to the vehicle-vertical axis A3. Reducing downward movement of the bumper 84 reduced torque generated on the vehicle 24 by reducing spacing S between an impact point O at the bumper 84 (applying rearward force to the vehicle 24) and the center of mass CM of the vehicle 24 (applying forward force from momentum of the vehicle 24). The torque may pivot the vehicle 24 about the bumper 84 and lift the passenger cabin 40. Reducing the amount of torque, e.g., by reducing the amount of vertical spacing between the bumper 84 and the center of mass CM, reduces rise of the passenger cabin 40 relative to the ground supporting the vehicle 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a pair of frame rails, each of the frame rails elongated along a vehicle-longitudinal axis and having a first bottom surface, a front portion, a rear portion, and an elevated portion above and between the front portion and the rear portion;
a cross-support fixed to at least one of the frame rails at the elevated portion and extending along a cross-vehicle axis from one of the frame rails toward the other of the frame rails, the cross-support having a second bottom surface; and
a bracket fixed to the first bottom surface of the frame rail at the elevated portion and fixed to the second bottom surface of the cross-support.

2. The assembly of claim 1, wherein the elevated portion includes a front inclined portion extending upward from the front portion of the frame rail, a rear inclined portion extending upward from the rear portion of the frame rail, and a middle portion extending from the front inclined portion to the rear inclined portion.

3. The assembly of claim 2, wherein the bracket is fixed to the middle portion of the elevated portion.

4. The assembly of claim 3, wherein the middle portion and the bracket are stiffer than the elevated portion where the middle portion connects to the rear inclined portion.

5. The assembly of claim 1, wherein the first bottom surface of each of the frame rails includes an inclined portion.

6. The assembly of claim 5, wherein the bracket is fixed to the bottom surface of the frame rail at the inclined portion.

7. The assembly of claim 5, wherein each of the frame rails are thicker forward of the inclined portion than rearward of the inclined portion.

8. The assembly of claim 1, wherein the bracket extends along the frame rail forward of the cross-support.

9. The assembly of claim 1, wherein the bracket includes a front edge, the front edge arcuately extending along the frame rail and the cross-support.

10. The assembly of claim 1, wherein the cross-support is an engine cradle.

11. The assembly of claim 1, wherein the bracket is L-shaped.

12. The assembly of claim 1, wherein the elevated portion and the bracket are stiffer than the frame rail forward of the bracket.

13. The assembly of claim 1, wherein the elevated portion and the bracket are stiffer than the frame rail where the rear portion connects to the elevated portion.

14. The assembly of claim 1, wherein the bracket includes a rear edge, the rear edge at the frame rail forward of the rear edge at the cross-support.

15. The assembly of claim 1, further comprising a body defining a passenger cabin, the bracket forward of the passenger cabin.

16. The assembly of claim 15, wherein the body is supported on the frame rails.

17. The assembly of claim 1, wherein each of the frame rails includes a front distal end, and further comprising a bumper fixed to the front distal ends of the frame rails.

18. An assembly, comprising:
a pair of frame rails, each of the frame rails elongated along a vehicle-longitudinal axis and having a front portion, a rear portion, and an elevated portion above and between the front portion and the rear portion;
a cross-support fixed to at least one of the frame rails at the elevated portion and extending along a cross-vehicle axis from one of the frame rails toward the other of the frame rails; and
a bracket fixed to the frame rail at the elevated portion and fixed to the cross-support, the bracket extending along the frame rail forward of the cross-support.

19. An assembly, comprising:
a pair of frame rails, each of the frame rails elongated along a vehicle-longitudinal axis and having a front portion, a rear portion, and an elevated portion above and between the front portion and the rear portion;
a cross-support fixed to at least one of the frame rails at the elevated portion and extending along a cross-vehicle axis from one of the frame rails toward the other of the frame rails; and
a bracket that is L-shaped, is fixed to the frame rail at the elevated portion, and is fixed to the cross-support.

20. The assembly of claim 19, wherein a first portion of the bracket extends forward along the frame rail from the cross-support, and a second portion of the bracket extends inward from the frame rail along the cross-support.

* * * * *